US010111146B2

(12) United States Patent
Kim et al.

(10) Patent No.: US 10,111,146 B2
(45) Date of Patent: Oct. 23, 2018

(54) METHOD AND DEVICE FOR SELECTING ACCESS NETWORK IN WIRELESS COMMUNICATION SYSTEM

(71) Applicant: LG ELECTRONICS INC., Seoul (KR)

(72) Inventors: Laeyoung Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 14/912,576

(22) PCT Filed: Sep. 29, 2014

(86) PCT No.: PCT/KR2014/009095
§ 371 (c)(1),
(2) Date: Feb. 17, 2016

(87) PCT Pub. No.: WO2015/050342
PCT Pub. Date: Apr. 9, 2015

(65) Prior Publication Data
US 2016/0212667 A1    Jul. 21, 2016

Related U.S. Application Data

(60) Provisional application No. 61/886,666, filed on Oct. 4, 2013, provisional application No. 61/984,044, filed on Apr. 25, 2014.

(51) Int. Cl.
*H04W 36/14* (2009.01)
*H04W 48/18* (2009.01)
(Continued)

(52) U.S. Cl.
CPC ......... *H04W 36/14* (2013.01); *H04L 12/5692* (2013.01); *H04W 36/32* (2013.01);
(Continued)

(58) Field of Classification Search
CPC ..... H04W 36/14; H04W 40/36; H04W 36/32; H04W 48/18; H04W 84/12; H04W 88/06; H04L 12/5692
See application file for complete search history.

(56) References Cited

U.S. PATENT DOCUMENTS

2014/0295913 A1* 10/2014 Gupta ................... H04W 74/02
455/552.1
2016/0044570 A1* 2/2016 Jeong .................... H04L 47/125
370/338

FOREIGN PATENT DOCUMENTS

KR    10-2012-0115399    10/2012
KR    10-2013-0058521    6/2013
(Continued)

OTHER PUBLICATIONS

PCT International Application No. PCT/KR2014/009095, Written Opinion of the International Searching Authority dated Jan. 14, 2015, 18 pages.

*Primary Examiner* — Andrew Lai
*Assistant Examiner* — Harry H Kim
(74) *Attorney, Agent, or Firm* — Lee, Hong, Degerman, Kang & Waimey

(57) ABSTRACT

The present invention relates to a wireless communication system, and more specifically, a method and a device for selecting an access network are disclosed. A method by which a terminal selects an access network in a wireless communication system, according to one embodiment of the present invention, can comprise the steps of: determining whether a packet service can be performed through a wireless LAN (WLAN) in use when the packet service is set to select a WLAN access network as an access network of the terminal for the packet service according to a predetermined rule while the terminal is using the WLAN; and performing an access network selection operation including a WLAN
(Continued)

selection or a WLAN reselection as a candidate on the basis of the result of the determination step.

4 Claims, 9 Drawing Sheets

(51) Int. Cl.
*H04W 36/32* (2009.01)
*H04W 40/36* (2009.01)
*H04W 88/06* (2009.01)
*H04W 84/12* (2009.01)
*H04L 12/54* (2013.01)

(52) U.S. Cl.
CPC ........... *H04W 40/36* (2013.01); *H04W 48/18* (2013.01); *H04W 84/12* (2013.01); *H04W 88/06* (2013.01)

(56) References Cited

FOREIGN PATENT DOCUMENTS

KR 10-2013-0084773 7/2013
KR 10-2013-0094826 8/2013

\* cited by examiner

METHOD AND DEVICE FOR SELECTING ACCESS NETWORK IN WIRELESS COMMUNICATION SYSTEM

CROSS-REFERENCE TO RELATED APPLICATIONS

This application is the National Stage filing under 35 U.S.C. 371 of International Application No. PCT/KR2014/009095, filed on Sep. 29, 2014, which claims the benefit of U.S. Provisional Application Nos. 61/886,666, filed on Oct. 4, 2013, and 61/984,044, filed on Apr. 25, 2014, the contents of which are all hereby incorporated by reference herein in their entirety.

TECHNICAL FIELD

The present invention relates to a wireless communication system, and more particularly, to a method and device for selecting an access network.

BACKGROUND ART

Network environments may include a cellular access network (e.g., 3rd Generation Partnership Project (3GPP) Global System for Mobile communication (GSM), Universal Mobile Telecommunication System (UMTS), Evolved Packet System (EPS), etc.) and a wireless local access network (WLAN). To fully and complementarily utilize a dual accessibility to the cellular access network and the WLAN, demands for dual mode UEs are increasing.

According to the related art, in case of a trusted non-3GPP access (for example, TWAN (Trusted WLAN Access Network)), an Internet protocol (IP) address allocated to a dual mode UE may be either an IP address allocated from a node (for example, PIN GW (Packet Data Network Gateway)) of a core network of a cellular access network, or an IP address allocated from an access point of a WLAN (that is, TWAN). That is, both the IP address for connection through a core network of a cellular network and an IP address for connection through a WLAN (that is, not through a core network) cannot be supported by the trusted non-3GPP access. For this reason, connection through the TWAN and connection through the core network cannot be performed at the same time.

DISCLOSURE

Technical Problem

An object of the present invention is to provide a solution for selecting an access network, which can efficiently use resources of an overall system, by overcoming restrictions in selection of an access network for packet service (or IP flow or IP traffic or application or PDN connection) for a dual mode UE which is using a TWAN.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

According to one embodiment of the present invention to solve the aforementioned technical problem, a method for enabling a user equipment (UE) to select an access network in a wireless communication system comprises the steps of determining whether a packet service can be performed through a wireless LAN (WLAN) in use when the UE is set to select a WLAN access network as an access network for the packet service of the UE in accordance with a predetermined rule while the UE is using the WLAN; and performing an access network selection operation including a WLAN selection or a WLAN reselection as a candidate on the basis of the result of the determining step.

According to another embodiment of the present invention to solve the aforementioned technical problem, a user equipment (UE) for selecting an access network in a wireless communication system comprises a transceiving module; and a processor, wherein the processor is configured to determine whether a packet service can be performed through a WLAN in use when the UE is set to select a WLAN access network as an access network for the packet service of the UE in accordance with a predetermined rule while the UE is using the WLAN, and perform an access network selection operation including a WLAN selection or a WLAN reselection as a candidate on the basis of the result of the determining step.

Followings may be applied to the embodiments of the present invention.

The access network selection operation may further include one or more of a cellular access network selection, an access network selection other than the WLAN, and a WLAN reselection as candidates when the packet service cannot be performed through the WLAN in use.

The access network selection operation may further include one or more of a WLAN selection, a selection of the WLAN in use, and an operation for performing the packet service based on the WLAN in use as candidates when the packet service can be performed through the WLAN in use.

The determining step may further include determining whether IP flow can be routed to the WLAN in use in the form of core network-routing, whether access of the IP flow to the core network can be provided through the WLAN in use, and/or whether the WLAN in use is a trusted WLAN access network (TWAN) and is being used by NSWO (Non-Seamless WLAN Offload), when the predetermined rule is an IFOM (IP (Internet Protocol) Flow Mobility) rule.

The access network selection operation may further include one or more of a selection of an access network of which priority defined by the IFOM rule is next to the WLAN and a selection of the WLAN in use as candidates when the predetermined rule is the IFOM rule.

The determining step may further include determining whether PDN connection can be established through the WLAN in use and/or whether the WLAN in use is a TWAN and is being used by NSWO when the predetermined rule is an MAPCON (Multi Access PDN (Packet Data Network) Connectivity) rule.

The access network selection operation may further include one or more of a selection of an access network of which priority defined by the MAPCON rule is next to the WLAN and a selection of the WLAN in use as candidates when the predetermined rule is the MAPCON rule.

The determining step may further include determining whether IP flow can be routed to the WLAN in use in the form of NSWO and/or whether the WLAN in use is a TWAN and is being used in the form of core network-routing, when the predetermined rule is an NSWO rule.

The access network selection operation may further include a selection of the WLAN in use as a candidate when the predetermined rule is the NSWO rule.

The access network selection operation may be determined based on reference information. The reference information may include one or more of information indicating one of candidates of the access network selection operation indicated by the predetermined rule, load information of a cellular access network, load information of a core network, signal strength information of the cellular access network, load information of the WLAN in use, signal strength information of the WLAN in use, information indicating whether there is available WLAN other than the WLAN in use, load information of an available WLAN which is not being used, signal strength information of an available WLAN which is not being used, user preference information, and property information of the packet service.

The packet service may be one of IP flow, IP traffic, application and PDN connection.

The UE may be a UE operated in a transparent single-connection mode, a UE operated in a single-connection mode, or a UE operated in a multi-connection mode.

The aforementioned description of the present invention and detailed description, which will be described later, are only exemplary, and are intended for additional description of the invention cited in claims.

Advantageous Effects

According to the present invention, a method and device for selecting an access network, which can efficiently use resources of an overall system, by overcoming restrictions in selection of an access network for packet service (or IP flow or IP traffic or application or PDN connection) for a dual mode UE which is using a TWAN.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
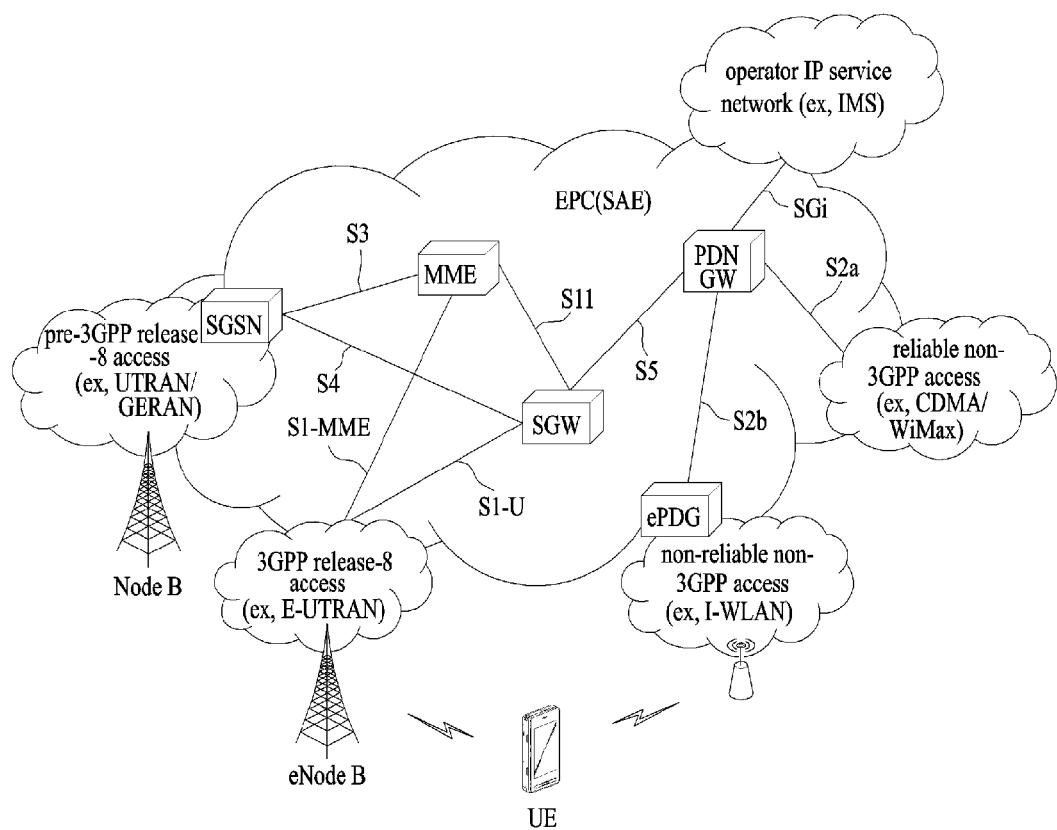
FIG. 1 is a diagram illustrating a brief structure of an Evolved Packet System (EPS) that includes an Evolved Packet Core (EPC)

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless communication systems. Although the following description will be made based on the 3GPP LTE and 3GPP LTE-A system for clarification, it is to be understood that the technical spirits of the present invention are not limited to the 3GPP LTE and 3GPP LTE-A system.

Terminologies used herein will be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): an ANDSF is an entity that allows a UE to discover a non-3GPP access network (for example, WLAN (or WiFi), Wimax, etc.) in addition to a 3GPP access network (for example, LTE (Long Term Evolution), LTE-A (Advanced), etc.), and provides rules and policies required to access the corresponding networks. The ANDSF includes a data management and control function required to provide data assisting network discovery and selection in accordance with policies of an operator. The ANDSF may initiate data transfer to a UE on the basis of a network trigger, or may respond to a request from the UE. The ANDSF may provide the UE with inter-system mobility policy (ISMP), inter-system routing policy (ISRP) or access network discovery information. An ANDSF of a home operator network of a subscriber may interwork with another database such as HSS for user profile information in the home operator network of the subscriber. Details of the ANDSF may be understood with reference to 3GPP TS 23.402 document.

TWAN (Trusted WLAN Access Network): a WLAN regarded to be trusted by an operator.

NSWO (Non-Seamless WLAN Offload): a technology for transmitting an IP flow to Internet through a WLAN access network, and for not guaranteeing mobility without seamless movement of the IP flow. A UE that supports NSWO may route the IP flow through a WLAN access without traversing an EPC, while being accessed to the WLAN access.

ISRP (Inter-System Routing Policy): a set of rules defined by an operator, which determine how a UE should route IP traffic through a plurality of radio access interfaces.

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |

TABLE 1-continued

| Reference Point | Description |
| --- | --- |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Figure 2:
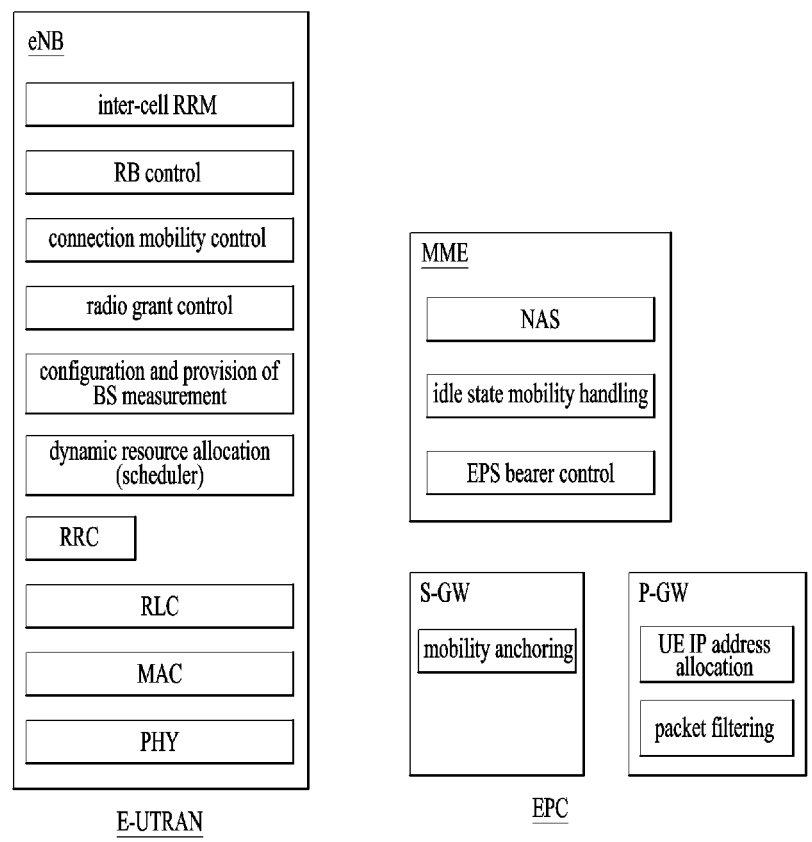
FIG. 2 is an exemplary diagram illustrating an architecture of a general E-UTRAN and a general EPC.

FIG. 2 is an exemplary diagram illustrating an architecture of a general E-UTRAN and EPC.

As shown, eNodeB may perform functions of routing toward a gateway during activation of Radio Resource Control (RRC) connection, scheduling and transmission of paging messages, scheduling and transmission of Broadcast Channel (BCH), dynamic allocation of resources to UE in both uplink and downlink, configuration and provisioning for eNodeB measurements, radio bearer control, radio admission control, and connection mobility control. In the EPC, the eNodeB may perform functions of paging occurrence, LTE-IDLE state management, ciphering of the user plane, System Architecture Evolution (SAE) bearer control, and ciphering and integrity protection of Non-Access Stratum (NAS) signaling.

Figure 3:
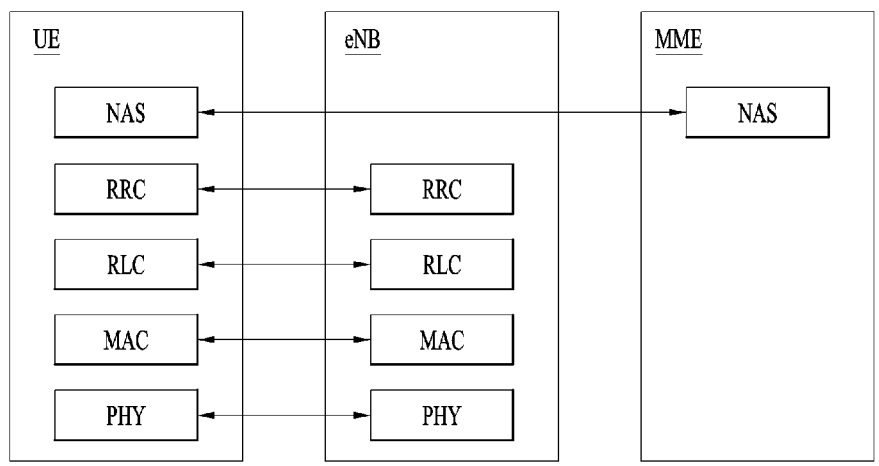
FIG. 3 is an exemplary diagram illustrating a structure of a radio interface protocol on a control plane.
Figure 4:
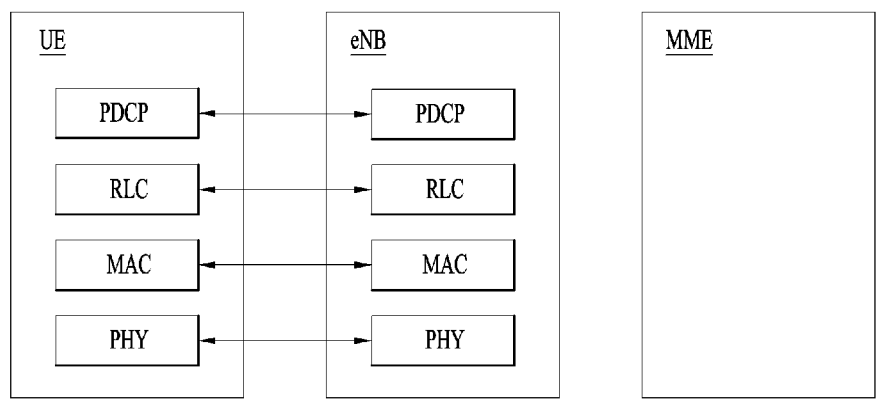
FIG. 4 is an exemplary diagram illustrating a structure of a radio interface protocol on a user plane.

FIG. 3 is an exemplary diagram illustrating a structure of a radio interface protocol on a control plane between a UE and a base station, and FIG. 4 is an exemplary diagram illustrating a structure of a radio interface protocol on a user plane between a UE and a base station.

The radio interface protocol is based on the 3GPP radio access network standard. The radio interface protocol horizontally includes a physical layer, a data link layer, and a network layer, and vertically includes a user plane for data information transfer and a control plane for signaling transfer (control signal transfer).

The protocol layers may be classified into L1 (first layer), L2 (second layer) and L3 (third layer) based on three lower layers of the open system interconnection (OSI) standard model widely known in the communications systems.

Hereinafter, each layer of the radio protocol on the control plane shown in FIG. 3 and the radio protocol on the user plane shown in FIG. 4 will be described.

The physical layer belonging to the first layer L1 provides an information transfer service using a physical channel. The physical layer is connected to a medium access control (MAC) layer above the physical layer via a transport channel. Data are transferred between the medium access control layer and the physical layer via the transport channel. And, data are transferred between different physical layers, that is, between one physical layer of a transmitting side and the other physical layer of a receiving side through the physical channel.

The physical channel includes a plurality of subframes on a time axis and a plurality of sub-carriers on a frequency axis. In this case, one subframe includes a plurality of symbols and a plurality of sub-carriers on a time axis. One subframe includes a plurality of resource blocks, each of which includes a plurality of symbols and a plurality of sub-carriers. A transmission time interval (TTI) which is unit time for transmitting data is 1 ms corresponding to one subframe.

The physical channels existing in the physical layers of the transmitting side and the receiving side may be classified into a physical downlink shared channel (PDSCH) and a physical uplink shared channel (PUSCH) which are data channels, and a physical downlink control channel (PD-CCH), a physical control format indicator channel (PCFCH), a physical hybrid-ARQ indicator channel (PHICH) and a physical uplink control channel (PUCCH), which are control channel, in accordance with the 3GPP LTE.

Several layers exist in the second layer.

First of all, the MAC layer of the second layer serves to map various logical channels into various transport channels, and also serves as logical channel multiplexing for mapping several logical channels into one transport channel. The MAC layer is connected with a radio link control (RLC) layer through a logical channel, wherein the RLC layer is located above the MAC layer. The logical channel is divided into a control channel transmitting information of the control plane and a traffic channel transmitting information of the user plane depending on types of transmitted information.

The RLC layer of the second layer serves to perform segmentation and concatenation of data received from its upper layer to control a size of the data so that the lower layer transmits the data to a radio interval.

A packet data convergence protocol (PDCP) layer of the second layer performs a header compression function for reducing a size of an IP packet header having relatively great size and unnecessary control information to effectively transmit data using IP packets such as IPv4 or IPv6 within a radio-communication interval having a narrow bandwidth. Also, in the LTE system, the PDCP layer performs a security function. The security function includes a ciphering function preventing the third party from performing data monitoring and an integrity protection function preventing the third party from performing data manipulation.

A radio resource control (RRC) layer located on the highest part of the third layer is defined in the control plane only and is associated with configuration, re-configuration and release of radio bearers (RBs) to be in charge of controlling the logical, transport and physical channels. In this case, the RB means a service provided by the second layer for the data transfer between the user equipment and the E-UTRAN.

If there is RRC connection between the RRC layer of the user equipment and the RRC layer of the E-UTRAN, the user equipment is in an RRC connected mode, and if not so, the user equipment is in an RRC idle mode.

Hereinafter, an RRC state of the UE and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state. Since the E-UTRAN may identify the presence of the user equipment which is in the RRC_CONNECTED state, on the basis of cell unit, the E-UTRAN may effectively control the user equipment. On the other hand, the E-UTRAN may not identify the user equipment which is in the RRC_IDLE state, on the basis of cell unit. In this case, the user equipment is managed by a core network (CN) on the basis of a tracking area (TA) unit which is a local unit greater than the cell unit. In other words, the presence of the user equipment which is in the RRC_IDLE state may be identified on the basis of a local unit greater than the cell unit, and in order that the user equipment which is in the RRC_IDLE state receives a general mobile communication service such as voice or data from the cell, the user equipment should be shifted to the RRC_CONNECTED state.

When the user initially turns on the power of the user equipment, the user equipment searches for a proper cell and then establishes RRC connection in the corresponding cell, and registers information of the user equipment in the core network. Afterwards, the user equipment is maintained in the RRC_IDLE state in the corresponding cell. The user equipment maintained in the RRC_IDLE state performs (re-)selects a cell if necessary and monitors system information or paging information. This will be referred to as camp on a cell. The user equipment maintained in the RRC_IDLE state establishes RRC connection with the RRC layer of the E-UTRAN through an RRC connection procedure only if the RRC connection is required, and then is shifted to the RRC_CONNECTED state. In this case, the case where the RRC connection is required may include a case where calling attempt or data transmission attempt of a user is required or a case where a response message to a paging message received from the E-UTRAN should be transmitted.

The NAS (Non-Access Stratum) layer located above the RRC layer serves to perform session management and mobility management.

The NAS layer shown in FIG. 3 will be described in detail as follows.

Evolved session management (eSM) which belongs to the NAS layer serves to perform default bearer management and dedicated bearer management to be in charge of controlling the user equipment to use a PS service from the network. The default bearer resource is allocated from the network during initial access to a specific packet data network (PDN). At this time, the network allocates an IP address, which may be used by the user equipment, to allow the user equipment to use a data service, and also allocates QoS of the default bearer. The LTE supports two kinds of bearers, that is, a bearer having a GBR (Guaranteed bit rate) QoS feature guaranteeing a specific bandwidth for data transmission and reception and a non-GBR bearer having the best effort QoS feature without guaranteeing a bandwidth. The default bearer is allocated with the non-GBR bearer. The dedicated bearer may be allocated with the bearer having QoS feature of GBR or non-GBR.

The bearer allocated from the network to the user equipment may be referred to as an evolved packet service (EPS) bearer, and the network allocates one ID when the EPS bearer is allocated. This ID will be referred to as EPS bearer ID. One EPS bearer has QoS feature of MBR (maximum bit rate) or/and GBR (guaranteed bit rate).

Figure 5:
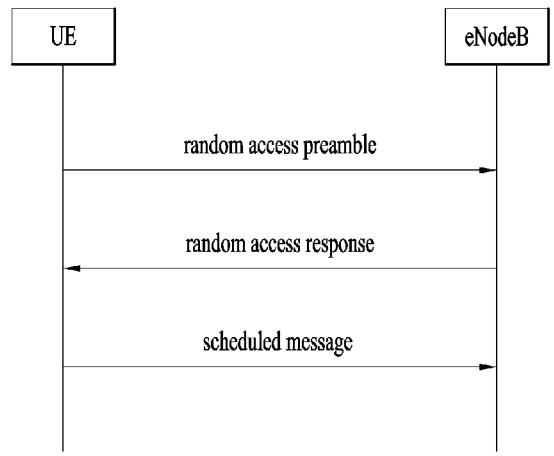
FIG. 5 is a flow chart illustrating a random access procedure.

FIG. 5 is a flow chart illustrating a random access procedure in the 3GPP LTE.

The random access procedure is used such that the UE obtains UL synchronization with the base station or is allocated with UL radio resource.

The UE receives a root index and a physical random access channel (PRACH) configuration index from the eNodeB. 64 candidate random access preambles defined by ZC (Zadoff-Chu) sequence exist per cell, and the root index is a logical index for allowing the UE to generate 64 candidate random access preambles.

Transmission of the random access preambles is limited to specific time and frequency resources per cell. The PRACH configuration index indicates a specific subframe and a specific preamble format, which enable transmission of the random access preambles.

The UE transmits a random access preamble, which is selected randomly, to the eNodeB. The UE selects one of the 64 candidate random access preambles, and selects a corresponding subframe by means of the PRACH configuration index. The UE transmits the selected random access preamble from the selected subframe.

The eNodeB that has received the random access preamble transits a random access response (RAR) to the UE. The random access response is detected by two stages. First of all, the UE detects a PDCCH masked with RA-RNTI (random access-RNTI). The UE receives a random access response within a MAC PDU (protocol data unit) on a PDSCH indicated by the detected PDCCH.

Figure 6:
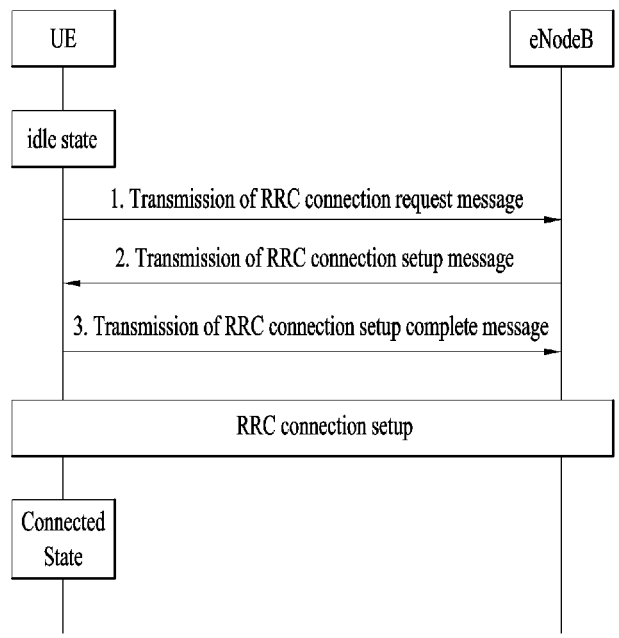
FIG. 6 is a diagram illustrating a connection procedure in a radio resource control (RRC) layer.

FIG. 6 is a diagram illustrating a connection procedure in a radio resource control (RRC) layer.

RRC state is shown in FIG. 6 in accordance with RRC connection. The RRC state means whether an entity of the RRC layer of the UE is logically connected with an entity of the RRC layer of the eNodeB. If the entity of the RRC layer of the UE is logically connected with the entity of the RRC layer of the eNodeB, it may be referred to as RRC connected state. If not so, it may be referred to as RRC idle state.

Since the E-UTRAN may identify the presence of the corresponding UE which is in the RRC connected state, on the basis of cell unit, the E-UTRAN may effectively control the UE. On the other hand, the E-UTRAN may not identify the user equipment which is in the RRC idle state, on the basis of cell unit. In this case, the UE is managed by a core network (CN) on the basis of a tracking area (TA) unit which is a local unit greater than the cell unit. In other words, the presence of the UE which is in the RRC idle state may be identified on the basis of a local unit greater than the cell unit, and in order that the UE which is in the RRC idle state receives a general mobile communication service such as voice or data from the cell, the UE should be shifted to the RRC connected state.

When the user initially turns on the power of the UE, the UE searches for a proper cell and then is maintained in the idle state in the corresponding cell. The UE maintained in the idle state establishes RRC connection with the RRC layer of the eNodeB through an RRC connection procedure when the RRC connection is required, and then is shifted to the RRC connected state.

In this case, the case where the RRC connection is required for the UE of the idle state may include several cases, for example, a case where calling attempt of a user or uplink data transmission is required or a case where a response message to a paging message received from the E-UTRAN should be transmitted.

The UE of the idle state should perform the RRC connection procedure as described above to establish RRC connection with the eNodeB. The RRC connection procedure includes a procedure of transmitting an RRC connection request message from the UE to the eNodeB, a procedure of transmitting an RRC connection setup message from the eNodeB to the UE, and a procedure of transmitting an RRC connection setup complete message from the UE to the eNodeB. These procedures will be described in more detail with reference to FIG. 6.

1) The UE of the idle state first transmits an RRC connection request message to the eNodeB to establish RRC connection with the eNodeB due to reasons such as call attempt, data transmission attempt, or response to paging of the eNodeB.

2) If the RRC connection request message is received from the UE, the eNodeB accepts the RRC connection request of the UE in the case that there are sufficient radio resources, and transmits an RRC connection setup message to the UE as a response message.

3) If the RRC connection setup message is received, the UE transmits an RRC connection setup complete message to the eNodeB. If the UE successfully transmits the RRC connection setup message, the UE establishes RRC connection with the eNodeB and is shifted to an RRC connected mode.

Figure 7:
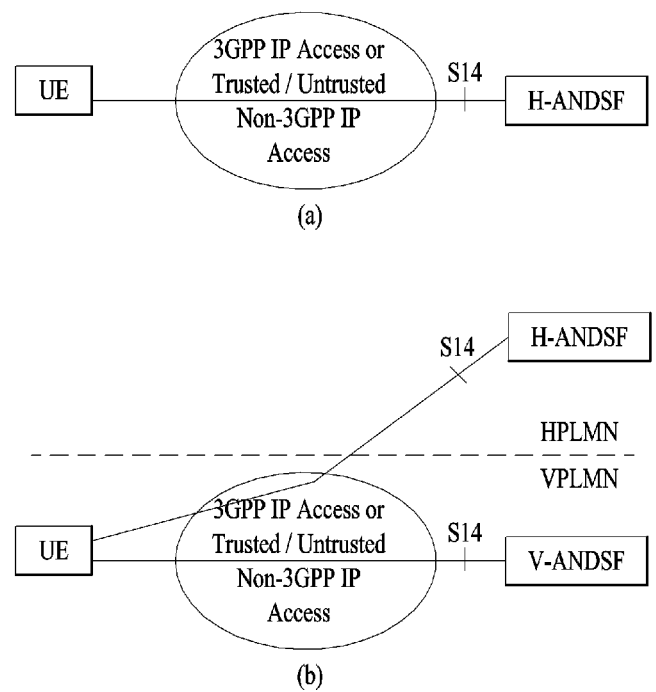
FIG. 7 is a diagram illustrating a structure used in an ANDSF.

FIG. 7 illustrates structures used in Access Network Discovery and Selection Functions (ANDSF).

FIG. 7(a) illustrates a non-roaming structure for Access Network Discovery and Selection Functions (ANDSF), and FIG. 7(b) illustrates a roaming structure for ANDSF.

An ANDSF entity located in a home PLMN (HPLMN) of a user equipment UE is referred to as a Home-ANDSF (H-ANDSF), and an ANDSF entity located in a visited PLMN (V-PLMN) of the corresponding user equipment UE is referred to as a Visited-ANDSF (V-ANDSF). Unless otherwise specified, the terminology, ANDSF is used to refer to both an H-ANDSF and a V-ANDSF. In the examples of FIGS. 7(a) and 7(b), the use of the ANDSF and interfaces may be optional.

NSWO Based Connection Through TWAN and Connection Through EPC

Figure 8:
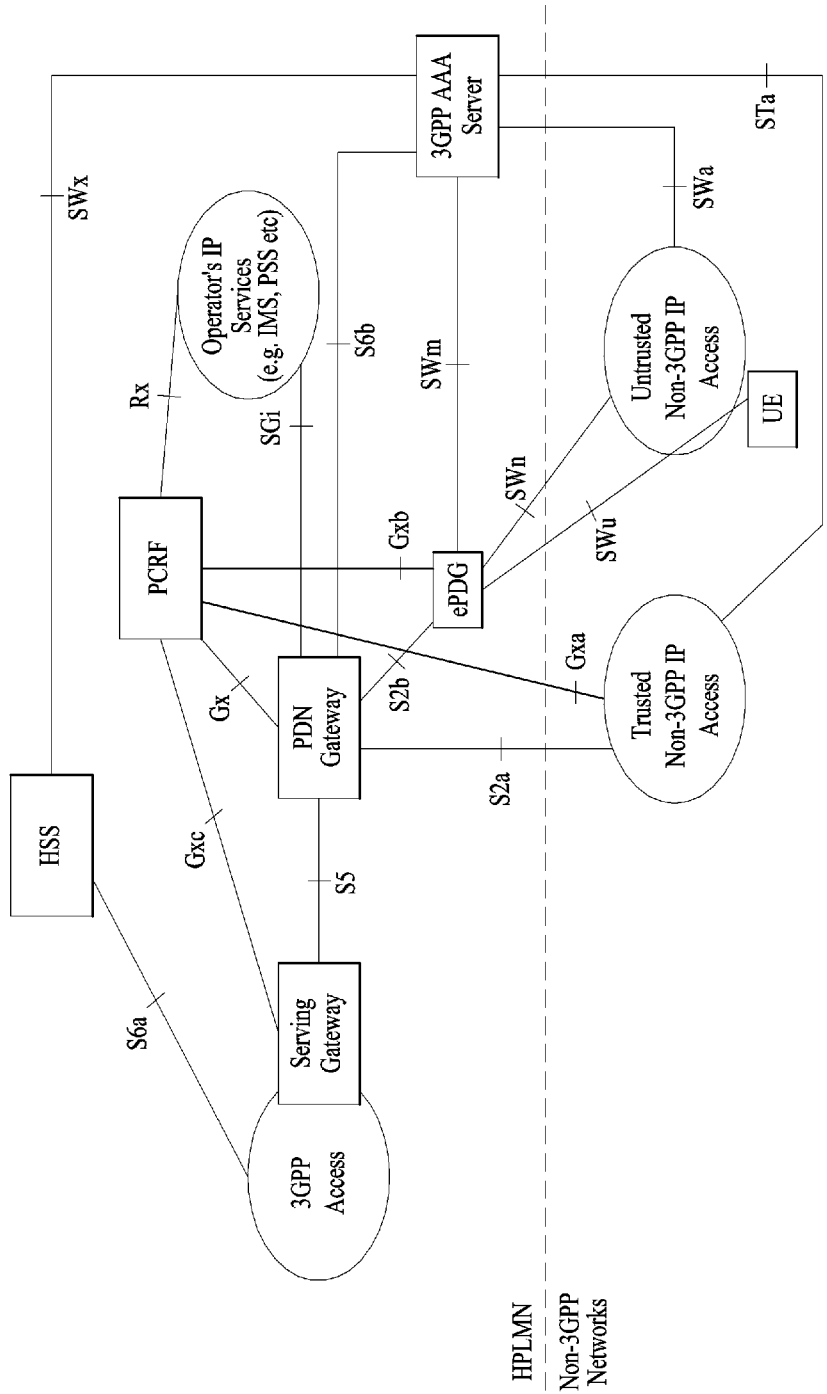
FIG. 8 is a diagram illustrating a non-loaming structure in which interfaces S2a and S2b are used within an EPS.

FIG. 8 is a diagram illustrating a non-loaming structure in which interfaces S2a and S2b are used within an EPS.

In the example of FIG. 8, a trusted non-3GPP IP access and an untrusted non-3GPP IP access are connected to the EPC through the interface S2a and the interface S2b, respectively.

Conventionally, a pre-3GPP release-11 WLAN has been regarded and managed as an untrusted non-3GPP IP access. In this case, the WLAN access network is connected to the EPC through an evolved packet data gateway (ePDG). That is, as shown in FIG. 8, the UE may be connected to the EPC through the interface S2b by accessing the WLAN and passing through the ePDG connected with the WLAN. Particularly, since the WLAN is regarded as the untrusted WLAN, an Internet Protocol Security (IPSec) protocol is used to protect traffic exchanged between the UE and the ePDG.

Figure 9:
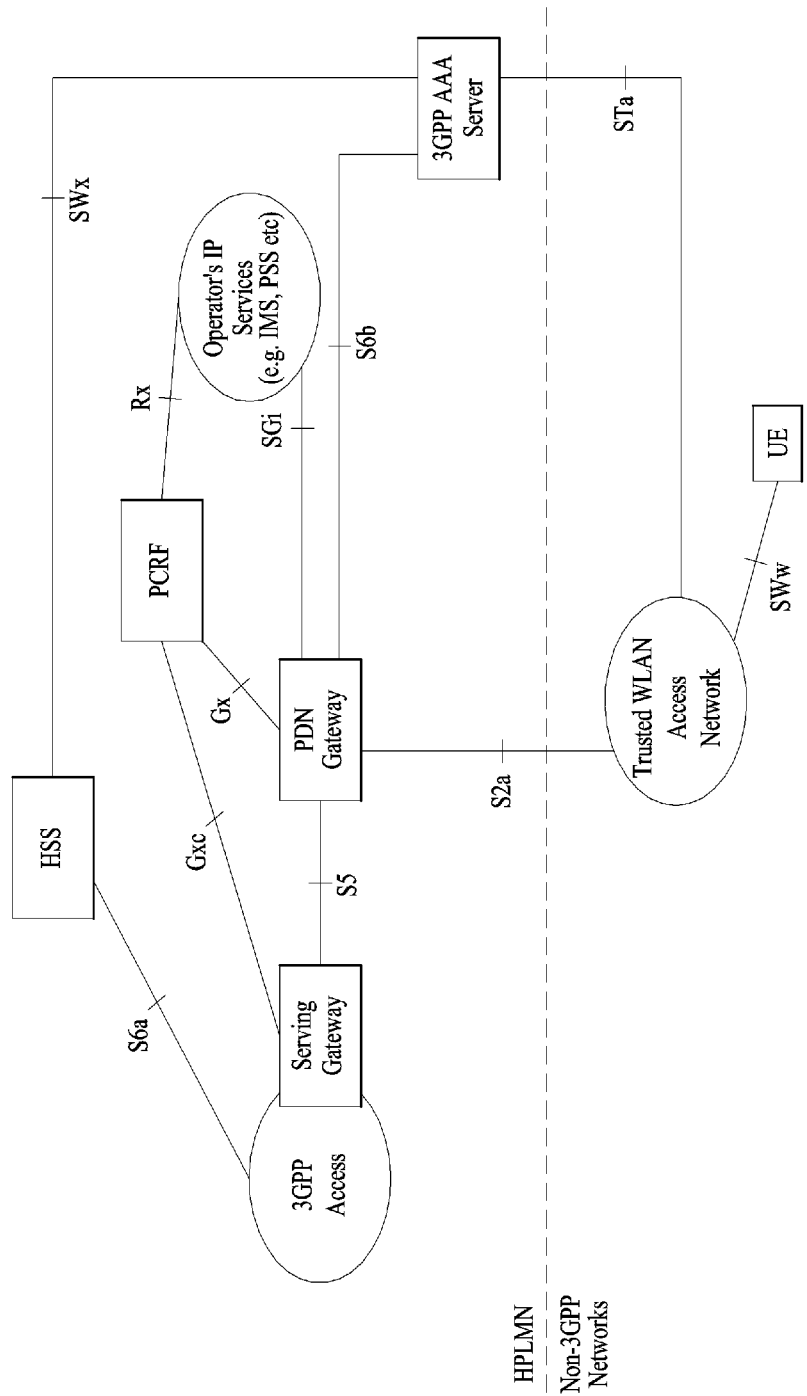
FIG. 9 is a diagram illustrating a non-loaming structure in which a TWAN access is connected to an EPC.

FIG. 9 is a diagram illustrating a non-loaming structure in which a TWAN access is connected to an EPS.

If the WLAN is considered as a trusted WLAN by an operator, a TWAN (trusted WLAN Access network) is interfaced with the EPC as a trusted non-3GPP access. As shown in FIG. 9, the UE may be connected to a 3GPP authentication, authorization and accounting (AAA) server/proxy through the interface STa and connected to the PDN GW through the interface S2a.

If the WLAN is managed by being considered as a trusted non-3GPP IP access, it is advantageous in that a separate network node called ePDG is not required and the UE does not need to implement an IPSec protocol, unlike that the WLAN is managed by being considered as an untrusted non-3GPP IP access.

Considering this advantage, the TWAN has been discussed in the 3GPP release-11. According to the discussion in the 3GPP release-11, the UE cannot perform the NSWO (Non-Seamless WLAN Offload) connection through the TWAN and connection to the EPC (that is, P-GW) through the interface S2a at the same time. In addition to this restriction, the task in the 3GPP release-11 has restrictions in that handover between the TWAN and the 3GPP access together with preservation of IP address, connectivity to an APN which is not designated as default (due to non-signaling by the UE) and connectivity to additional PDN initiated by the UE cannot be performed.

Discussion for solving the above restrictions has been progressed in the 3GPP release-12. In the 3GPP release-12, when the UE accesses the TWAN, the UE can be operated in one of two modes as follows (for details, refer to 3GPP S2-133851 document).

Single-Connection mode: A communication mode that is capable to support only a single connection between a UE and a trusted WLAN (TWAN) at a random time. This connection can be used either for Non-Seamless WLAN Offload (NSWO) or for PDN connectivity. The use of the Single-Connection mode and the associated parameters of the connection (e.g. parameters for NSWO, parameters for PDN connectivity, APN, etc.) can be negotiated during authentication over TWAN.

Multi-Connection mode: A communication mode that is capable to support a single or multiple connections between a UE and a TWAN at a random time. One connection can be used for NWSO, and one or more simultaneous connections can be used for PDN connectivity. The use of the Multi-Connection mode can be negotiated during authentication over TWAN and the requested PDN connection can be setup using a WLAN Control Protocol (WLCP) for PDN connectivity.

For example, when the UE is operated in the single-connection mode of the above two modes discussed in the 3GPP release-12, the UE cannot perform the NSWO connection through the TWAN and connection to the EPC (specifically, P-GW) through the interface S2a at the same time like the 3GPP release-11.

Figure 10:
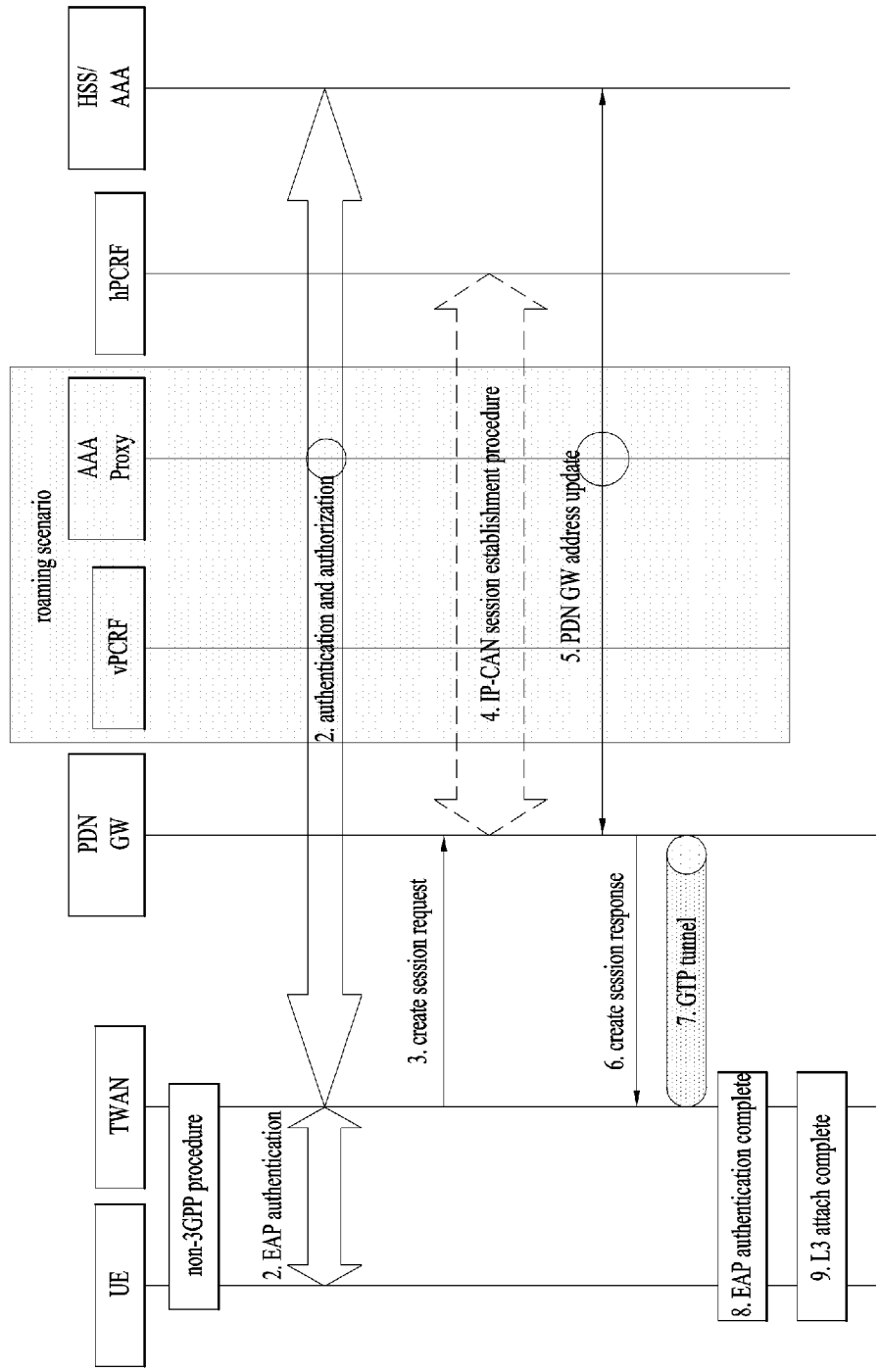
FIG. 10 is a diagram illustrating a procedure of attaching a UE to a TWAN in a 3GPP release-11 system.

FIG. 10 is a diagram illustrating a procedure of attaching a UE to a TWAN in a 3GPP release-11 system. WLAN initial attachment on a GTP (GPRS Tunneling Protocol) S2a is shown in the example of FIG. 10.

In step 1 of FIG. 10, a non-3GPP procedure (for example, initial TWAN specific L2 (second layer) procedure) is performed. This procedure is performed TWAN-specifically, and is not defined in the 3GPP system.

In step 2 of FIG. 10, an EAP (Extensible Authentication Protocol) procedure is initiated and performed involving the UE, the TWAN and the 3GPP AAA server. In the roaming case, there may be several AAA proxies involved. At this step, subscription data are provided to the TWAN by the HSS/AAA. A list of all of the authorized APNs, which include additional PDN GW selection information, is returned to the TWAN as a part of a response to the TWAN from the 3GPP AAA server. The subscription data may also include a default APN for WLAN that is different from the default APN for other accesses. The 3GPP AAA Server also returns, to the TWAN, the User Identity used to identify the UE in the Create Session Request. IEEE Std 802.1X-2004 is used over the WLAN air link to support EAP as defined by IEEE Std 802.11-2007.

The TWAN may provide, to the 3GPP AAA server via STa, information as to SSID (Service Set Identification) selected by the UE to access the TWAN and information indicating whether the corresponding UE supports S2a, NSWO (Non-Seamless WLAN Offload), or both of S2a and NSWO. The HSS/AAA may indicate via STa whether access to the EPC via S2a, NSWO or both of S2a and NSWO are allowed for the corresponding subscriber. The HSS/AAA decision to allow EPC access or NSWO or both could be based on information elements such as subscriber profile, selected access network, and/or selected SSID.

The TWAN determines, based on HSS/AAA indication or pre-configured information, whether or not to establish S2a. If the TWAN determines that S2a shall not be used, following steps 3 to 7 are skipped. Instead, if the use of NSWO is authorized, the TWAN performs NSWO for the subscriber.

In step 3 of FIG. 10, the TWAN selects the S2a protocol variant (either GTP or PMIP (Proxy Mobile Internet Protocol)). In this example, it is assumed that GTP is selected. The TWAN may be configured with the S2a protocol variant(s) on a per HPLMN granularity, or may receive information regarding the S2a protocol variants supported by the PDN GW (PMIP and/or GTP) from an entity that performs a DNS (Domain Name Service) function.

The TWAN selects the PGW in accordance with the PGW selection procedure (for example, see clause 4.5.1 of 3GPP TS 23.402 document). If the TWAN receives a PGW identification information under the form of a fully qualified domain name (FQDN), the TWAN derives, from the FQDN, an IP address of a PGW for the selected mobility management protocol (GTP in this example).

The TWAN selects default APN in accordance with the subscription data received in the step 2. The TWAN transmits a Create Session Request message to the PDN GW. The create session request message may include IMSI (International Mobile Subscriber Identity), APN, RAT (Radio Access Technology) type, TWAN TEID (Tunnel Endpoint Identification) of the control plane, PDN Type, PDN Address, EPS Bearer Identification information, Default EPS Bearer QoS (Quality of Service), TWAN Address for the user plane, TWAN TEID of the user plane, APN-AMBR (Aggregate maximum bit rate), Selection Mode, Dual Address Bearer Flag, Trace Information, Charging Characteristics, Serving Network, Additional parameters, etc. The RAT type indicates the non-3GPP IP access technology type. The PDN Type is set based on the result of the step 2. The TWAN sets the Dual Address Bearer Flag when the PDN type is set to IPv4v6. The TWAN includes Trace Information if PDN GW trace is activated. The Serving Network parameter identifies the selected PLMN (i.e., VPLMN in roaming case, and HPLMN in non-roaming case) used for 3GPP-based access authentication. Additionally, if location information is transmitted, the Create Session Request message should include BSSID (Basic Service Set Identification) and should also include the SSID of the access point to which the UE is attached.

The PDN GW creates a new entry in its bearer context table and generates a Charging ID. The new entry allows the PDN GW to route user plane PDUs between the TWAN and the PDN and to start charging.

The EPS Bearer Identification information and Default EPS Bearer QoS parameters convey S2a bearer identification information and default S2a bearer QoS.

In step 4 of FIG. 10, the PDN GW initiates an IP-CAN (Connectivity Access Network) Session Establishment Procedure with a PCRF (Policy and charging rules function) (see 3GPP TS 23.203). The PDN GW provides the PCRF with information used to identify the session. The PCRF creates IP-CAN session related information and responds to the PDN GW with PCC (Policy Control and Charging) rules and event triggers. The PCRF may modify the APN-AMBR and transmit the APN-AMBR to the PDN GW through the response message.

In step 5 of FIG. 10, the selected PDN GW informs the 3GPP AAA Server of its PDN GW identification information and the APN corresponding to the UE's PDN Connection. This message includes information that identifies the PLMN in which the PDN GW is located. This information is registered in the HSS (see clause 12 of 3GPP TS 23.402).

When informing the 3GPP AAA Server of the PDN GW identification information, the selected PDN GW also indicates the selected S2a protocol variant (GTP in this example). Therefore, the PDN GW allows the 3GPP AAA Server or 3GPP AAA Proxy not to return PMIP specific parameters (e.g. static QoS Profile, Trace Information, APN-AMBR, etc.) to the PDN GW PMIP if GTP is used over S2a. If the PDN GW receives the PMIP specific parameters from the 3GPP AAA Server or 3GPP AAA Proxy, the PDN GW ignores those parameters.

In step 6 of FIG. 10, the PDN GW returns a Create Session Response message, which includes the IP address(es) allocated for the UE, to the TWAN. The create session response message includes PDN GW Address for the user plane, PDN GW TEID of the user plane, PDN GW TEID of the control plane, PDN Type, PDN Address, EPS Bearer Identification information, EPS Bearer QoS, APN-AMBR, cause information, additional parameters, etc.

The PDN GW may initiate the creation of dedicated bearers on GTP based S2a. This is similar to the operation in GTP based S5/S8 for an Attach on 3GPP access.

In step 7 of FIG. 10, a GTP tunnel is set up between the TWAN and the PDN GW.

In step 8 of FIG. 10, the TWAN transmits EAP success to the UE, thus completing EAP authentication. Although the step 8 is performed after the step 7 in FIG. 10, the step 8 may be performed before or after the steps 3 to 7, or may be performed in parallel with the steps 3 to 7 in accordance with implementation. The UE may transmit IPv6 Router Solicitation at any time after the step 8.

In step 9 of FIG. 10, a DHCPv4 (Dynamic Host Configuration Protocol version 4) message is transmitted to the UE together with Router Advertisement with IPv4 address and/or IPv6 prefix allocated in the corresponding step. The UE may perform additional IP layer configuration with the TWAN as per standard IETF (Internet Engineering Task Force) procedures (e.g., IPv6 Stateless Address Autoconfiguration as per IETF RFC 4862 or Stateless DHCPv6 as per IETF RFC 3736).

After the step 8, the TWAN may transmit unsolicited IP layer configuration signaling (e.g., router advertisement (RA) over the point-to-point link towards the UE.

According to the example of FIG. 10, the UE may acquire IP address after authentication of the step 8 is completed. The IP address may be acquired using the DHCPv4 in case of IPv4 address and using the Router Advertisement/Router Solicitation which is an NDP (Neighbor Discovery Protocol) in case of IPv6 address, as described in the step 9. At this time, the IP address acquired by the UE is the IP address allocated from the TWAN if the NSWO connection is determined, and is the IP address allocated from the P-GW if connection to the EPC (that is, P-GW) through the interface S2a is determined. In order that the UE simultaneously uses the NSWO connection through the TWAN and the connection to the EPC, the UE should be allocated with IP address for each of the NSWO connection and the connection to the EPC. This allows the UE to repeatedly acquire IP address by using the same manner. At this time, if the UE acquires IP address twice by using the same manner, it is not possible to identify IP address for the NSWO connection from IP address for the connection to the EPC. For this reason, there exists a restriction that the UE cannot perform the NSWO connection through the TWAN and the connection to the EPC through the interface S2a at the same time.

Even in case of the single-connection mode discussed in the 3GPP release-12, there exists a restriction that the UE cannot perform the NSWO connection through the TWAN and the connection to the EPC through the interface S2a at the same time due to a reason similar to the above reason (that is, because the UE cannot identify IP address for the NSWO connection and IP address for the connection to the EPC from each other).

WLAN Network Selection/Reselection

In the 3GPP release-12, as a work item called a WLAN_NS (WLAN Network Selection) for 3GPP UEs, an enhanced WLAN network selection method has been discussed for a dual mode UE that supports a cellular access network (for example, 3GPP cellular access network (E-UTRAN, UTRAN, GERAN, etc.) or 3GPP2 cellular access network, etc.) and a WLAN (or Wi-Fi) access network (for example, hotspot 2.0, etc.). Therefore, the UE may select or reselect a WLAN based on a WLAN selection policy (WLANSP) (for example, see 3GPP S2-133688, S2-133689 and S2-133690).

In the WLANSP based WLAN selection/reselection method, if the WLAN is selected, it is recommended that reselection of the WLAN due to new packet service (or IP flow or IP traffic or application or PDN connection) should not be performed.

In more detail, the UE performs the WLAN selection based on an active WLANSP rule without taking into account real-time events associated with an active ISRP rule. The active ISRP rule is used only for routing decision and does not affect the selection or reselection of the WLAN access network. For example, when a new IP flow in the UE matches an active ISRP rule in which the highest priority access network is a WLAN other than the selected WLAN, this event does not trigger WLAN re-selection. Also, if the conditions for WLAN selection change every time a new application runs or when a new IP flow is detected, the WLAN selection of the UE will be complex and may lead to frequent WLAN re-selections that would negatively affect the user experience and the battery consumption. Therefore, the UE does not reselect the WLAN even though another WLAN not the WLAN which is currently used (or accessed) is considered as a WLAN with higher priority (that is, more appropriate WLAN) for new packet service (or IP flow or IP traffic or application or PDN connection).

In the aforementioned description, ISRP is policy information that defines an access network preferred (that is, with high priority) or restricted for routing/steering of packet service (or IP flow or IP traffic or application or PDN connection), and may be configured by three types of rules (IFOM rule, MAPCON rule and NSWO rule).

The IFOM (IP Flow Mobility) rule identifies a prioritised list of access technologies/access networks which should be used by the UE when routing of traffic that matches specific IP traffic filters on a specific APN or on any APN is available. This rule can also identify which radio accesses are restricted for traffic that matches specific IP traffic filters on a specific APN or on any APN.

The MAPCON (Multi Access PDN Connectivity) rule identifies a prioritised list of access technologies/access networks which should be used by the UE when routing of PDN connections to specific APNs is available. This rule can also identify which radio accesses are restricted for PDN connections to specific APNs.

The NSWO rule identifies which traffic shall or shall not be non-seamlessly offloaded (NSO) to a WLAN when available.

Enhanced Access Network Selection Method

As described above, it may be assumed that the active IFOM rule or the active MAPCON rule defines that the UE which is already using the TWAN in the form of NSWO should select a WLAN access not a cellular access as an access network (or access technology, hereinafter, referred to as "access network") with high priority for packet service (or IP flow or IP traffic or application or PDN connection) matched with the active IFOM rule or the active MAPCON rule. In this case, there is a restriction that a UE (that is, UE operated in a transparent single-connection mode in the 3GPP release-12) according to the operation defined in the 3GPP release-11 and a UE operated in a single-connection mode cannot perform WLAN connection/use in the form of the NSWO through the TWAN and WLAN connection/use in the form of EPC-routing (that is, PDN connection through EPC) at the same time. Also, in this case, the access network selection/reselection method for the packet service (or IP flow or IP traffic or application or PDN connection) is not provided in the related art.

Also, it may be assumed that the active NSWO rule defines that the UE which is already using the TWAN in the form of EPC-routing should route packet service (or IP flow or IP traffic or application or PDN connection) matched with the active NSWO rule to the WLAN.

In this case, there is a restriction that a UE operated in a transparent single-connection mode and a UE operated in a single-connection mode cannot perform WLAN connection/use in the form of the NSWO through the TWAN and WLAN connection/use in the form of EPC-routing at the same time. Also, in this case, the access network selection/reselection method for the packet service (or IP flow or IP traffic or application or PDN connection) is not provided in the related art.

Also, in the above case, there is a restriction that a UE operated in a multi-connection mode is not able to add an NSWO type service through the TWAN if the UE is using the same TWAN in the form of EPC-routing (that is, if WLAN connection/use in the form of NSWO does not exist and PDN connection(s) exist(s) only, or if the UE is authorized to connect and use the WLAN in the form of EPC-routing during TWAN access). Also, in this case, the access network selection/reselection method for the packet service (or IP flow or IP traffic or application or PDN connection) is not provided in the related art.

In the present invention, to solve the aforementioned problems, if a dual mode UE (hereinafter, it is to be understood that "terminal" or "UE" is referred to as a dual mode UE unless otherwise specified), which supports a cellular access network and a WLAN (or Wi-Fi) access network, is already using the WLAN, a method for supporting access network selection for packet service (or IP flow or IP traffic or application or PDN connection) will be suggested. Hereinafter, various examples of the present invention may be used in combination of one or more.

In the following examples, one of packet service, IP flow, IP traffic, application and PDN connection may be used to refer to the other terms.

Embodiment 1

If a UE (that is, UE according to the 3GPP release-11) operated in a transparent single-connection mode or a UE operated in a single-connection mode is already using (or accessing) a WLAN (or TWAN), the active IFOM rule defines that a WLAN access not a cellular network should be selected as an access network with high priority with respect to an IP flow matched with the active IFOM rule. In this case, the corresponding UE can perform one or more of the following embodiments. According to the method suggested in the present invention, WLAN selection/reselection is included in access network selection candidates as one candidate even though the WLAN is currently used (or accessed), unlike the related art.

Embodiment 1-1

The UE may perform one or more operations of (1), (2) and (3) below.

(1) The UE can check or determine whether routing of the IP flow is available in the form of EPC-routing to the WLAN which is currently used (or accessed) (or whether EPC-routing of the IP flow is valid or effective).

(2) The UE can check or determine whether to provide access to the EPC through the WLAN which is currently used (accessed) for the IP flow (or whether access to the EPC is valid or effective).

(3) The UE can check or determine whether the WLAN which is currently used (or accessed) is a TWAN and is being used in the form of NSWO.

Embodiment 1-2

In the case that one or more of the following conditions (A), (B) and (C) are satisfied:

(A) if the IP flow cannot be routed to the WLAN, which is currently used (or accessed), in the form of EPC-routing (or if EPC-routing of the IP flow is not valid or effective);

(B) if access to the EPC of the IP flow cannot be provided through the WLAN which is currently used (or accessed) (or if access to the EPC is not valid or effective); and (C) if the WLAN which is currently used (or accessed) is a TWAN and is being used in the form of NSWO, the UE can perform one or more of the following operations (i), (ii), (iii), (iv) and (v) in selecting an access network for routing the IP flow:

(i) the UE selects a cellular access network;

(ii) the UE does not select a WLAN (or selects an access network other than the WLAN);

(iii) the UE selects an access network of which a priority defined by the active IFOM rule is next to the WLAN;

(iv) the UE performs a reselection operation of the WLAN (in this case, if the WLAN which is currently used is reselected as a result of the reselection operation, the UE may perform a re-access/re-connection operation for requesting the WLAN of access to the EPC); and (v) the UE selects the WLAN which is currently used (or accessed) (in this case, the UE may perform a re-access/re-connection operation for requesting the WLAN of access to the EPC).

Embodiment 1-3

In the case that one or more of the following conditions (A'), (B') and (C') are satisfied:

(A') if the IP flow can be routed to the WLAN, which is currently used (or accessed), in the form of EPC-routing (or if EPC-routing of the IP flow is valid or effective);

(B') if access to the EPC of the IP flow can be provided through the WLAN which is currently used (or accessed) (or if access to the EPC is valid or effective); and (C') if the WLAN which is currently used (or accessed) is a TWAN and is not being used in the form of NSWO (that is, if the WLAN is used in the form of EPC-routing), the UE can perform one or more of the following operations (i'), (ii') and (iii') in selecting an access network for routing the IP flow:

(i') the UE selects a WLAN;

(ii') the UE selects the WLAN which is currently used (or accessed); and (iii') the UE routes the IP flow to the WLAN which is currently used (or accessed).

In the embodiment 1-2 or 1-3, as reference information for determining one or more of the operations (i) to (v) in the UE, or as reference information for determining one or more of the operations (i') to (iii') in the UE, one or more of the followings ① to ⑪ may be used.

① Information indicated by the active IFOM rule or the policy that includes the IFOM rule. For example, indication(s) or flag(s) indicating one or more of the above (i) to (v), or indication(s) or flag(s) indicating one or more of the above (i') to (iii').

② Load/overload/congestion information of the cellular access network. This information may be information acquired explicitly or implicitly from a network (for example, eNodeB, MME, ANDSF, etc.). For example, this information may be ACB (Access Class Barring) information, EAB (Extended Access Barring) information, etc., which are received from the eNodeB.

③ Load/overload/congestion information of a core network. This information may be information acquired explicitly or implicitly from a network (for example, eNodeB, MME, ANDSF, etc.). For example, this information may be a mobility management (MM) backoff timer or a session management (SM) backoff timer, which is received from the MME.

④ Signal strength information of the cellular access network. For example, this information may be RSRP (Reference Symbol Received Power), RSRQ (Reference Symbol Received Quality), etc.

⑤ Load/overload/congestion information of a WLAN which is currently used (or accessed). For example, this information may be BSS load information and/or a transmission rate of a backhaul to which the WLAN is connected.

⑥ Signal strength information of a WLAN which is currently used (or accessed).

⑦ Information indicating whether there is any available WLAN other than the WLAN which is currently used (or accessed).

⑧ Load/overload/congestion information of WLAN(s) which is(are) not used (or accessed) currently but available. For example, this information may be BSS load information and/or a transmission rate of a backhaul to which the WLAN is connected.

⑨ Signal strength information of WLAN(s) which is (are) not used currently (or accessed) but available.

⑩ User preference information.

⑪ Property of a target IP flow. For example, this property may include a type of an application of the corresponding IP flow, a protocol type, QoS property (for example, ToS (Type of Service), DS (Differentiated Service), etc.), a type or property (for example, whether APN is for Internet or IMS service) of an APN to which the corresponding IP flow belongs, and information indicating whether seamless handover is required for a cellular access network when the corresponding IP flow is out of WLAN coverage.

According to the present invention, based on the aforementioned various kinds of reference information (for example, one or more of ① to ⑪), if the aforementioned conditions are satisfied (for example, if one or more of the conditions (A), (B) and (C) are satisfied, or if one or more of the conditions (A'), (B') and (C') are satisfied), exemplary operations for selecting an access network for routing an IP flow matched with the active IFOM rule are as follows. The following operations are only exemplary, and the present invention is not limited to the following operations.

Exemplary operation 1—If the cellular access network and the core network are not overload/congestion statuses, and if the WLAN which is currently used (or accessed) by the UE is an overload/congestion status, the UE can select the cellular access network to route the corresponding IP flow. Therefore, the UE can actively provide a service of the IP flow through the cellular access network while preventing the WLAN which is currently used (or accessed) from being more congested.

Exemplary operation 2—If the cellular access network is an overload/congestion status, and if there exist(s) available WLAN(s) other than the WLAN which is currently used (or accessed) by the UE, the UE can perform a reselection operation of the WLAN. Therefore, the UE can actively provide a service of the IP flow through the WLAN access network while preventing the cellular access network from being more congested.

Exemplary operation 3—If the core network is an overload/congestion status, if the WLAN which is currently used (or accessed) by the UE is not an overload/congestion status, and if it is sufficient to provide the best effort service according to QoS property of the IP flow, the UE can select the WLAN which is currently used. Also, the UE can route the IP flow in the form of NSWO through the WLAN. Therefore, the UE can provide a service of the IP flow without any problem through the WLAN access network while preventing the core network from being more congested.

Embodiment 2

If a UE (that is, UE according to the 3GPP release-11) operated in a transparent single-connection mode or a UE operated in a single-connection mode is already using (or accessing) a WLAN (or TWAN), the active MAPCON rule defines that a WLAN access not a cellular network should be selected as an access network with high priority with respect to PDN connection matched with the active MAPCON rule. In this case, the corresponding UE can perform one or more of the following embodiments. According to the method suggested in the present invention, WLAN selection/reselection is included in access network selection candidates as one candidate even though the WLAN is currently used (or accessed), unlike the related art.

Embodiment 2-1

The UE may perform one or more operations of (1) and (2) below.

(1) The UE can check or determine whether establishment of PDN connection is available through the WLAN which is currently used (or accessed) (or whether establishment of PDN connection is valid or effective).

(2) The UE can check or determine whether the WLAN which is currently used (accessed) is a TWAN and is being used in the form of NSWO.

Embodiment 2-2

In the case that one or more of the following conditions (A) and (B) are satisfied:

(A) if the PDN connection cannot be established through the WLAN which is currently used (or accessed) (or if establishment of the PDN connection is not valid or effective); and (B) if the WLAN which is currently used (or accessed) is a TWAN and is being used in the form of NSWO, the UE can perform one or more of the following operations (i), (ii), (iii), (iv) and (v) in selecting an access network for establishing the PDN connection:

(i) the UE selects a cellular access network;

(ii) the UE does not select a WLAN (or selects an access network other than the WLAN);

(iii) the UE selects an access network of which a priority defined by the active MAPCON rule is next to the WLAN;

(iv) the UE performs a reselection operation of the WLAN (in this case, if the WLAN which is currently used is reselected as a result of the reselection operation, the UE performs a re-access/re-connection operation for requesting the WLAN of access to the EPC); and (v) the UE selects the WLAN which is currently used (or accessed) (in this case, the UE performs a re-access/re-connection operation for requesting the WLAN of access to the EPC).

Embodiment 2-3

In the case that one or more of the following conditions (A') and (B') are satisfied:

(A') if the PDN connection can be established through the WLAN which is currently used (or accessed) (or if establishment of the PDN connection is valid or effective); and (B') if the WLAN which is currently used (or accessed) is a TWAN and is not being used in the form of NSWO (that is, if the corresponding WLAN is being used in the form of EPC-routing), the UE can perform one or more of the following operations (i'), (ii') and (iii') in selecting an access network for establishing the PDN connection:

(i') the UE selects a WLAN;

(ii') the UE selects the WLAN which is currently used (or accessed); and (iii') the UE establishes the PDN connection through the WLAN which is currently used (or accessed).

In the embodiment 2-2 or 2-3, as reference information for determining one or more of the operations (i) to (v) in the UE, or as reference information for determining one or more of the operations (i') to (iii') in the UE, one or more of the followings ① to ⑪ may be used.

① Information indicated by the active MAPCON rule or the policy that includes the MAPCON rule. For example, indication(s) or flag(s) indicating one or more of the above (i) to (v), or indication(s) or flag(s) indicating one or more of the above (i') to (iii').

② Load/overload/congestion information of the cellular access network. This information may be information acquired explicitly or implicitly from a network (for example, eNodeB, MME, ANDSF, etc.). For example, this information may be ACB (Access Class Barring) information, EAB (Extended Access Barring) information, etc., which are received from the eNodeB.

③ Load/overload/congestion information of a core network. This information may be information acquired explicitly or implicitly from a network (for example, eNodeB, MME, ANDSF, etc.). For example, this information may be a mobility management (MM) backoff timer or a session management (SM) backoff timer, which is received from the MME.

④ Signal strength information of the cellular access network. For example, this information may be RSRP (Reference Symbol Received Power), RSRQ (Reference Symbol Received Quality), etc.

⑤ Load/overload/congestion information of a WLAN which is currently used (or accessed). For example, this information may be BSS load information and/or a transmission rate of a backhaul to which the WLAN is connected.

⑥ Signal strength information of a WLAN which is currently used (or accessed).

⑦ Information indicating whether there is any available WLAN other than the WLAN which is currently used (or accessed).

⑧ Load/overload/congestion information of WLAN(s) which are not used (or accessed) currently but available. For example, this information may be BSS load information and/or a transmission rate of a backhaul to which the WLAN is connected.

⑨ Signal strength information of WLAN(s) which is (are) not used currently (or accessed) but available.

⑩ User preference information.

⑪ Information indicating a type or property of an APN of a target PDN connection. For example, this information may be information indicating whether the APN is for Internet or IMS service.

According to the present invention, based on the aforementioned various kinds of reference information (for example, one or more of ① to ⑪), if the aforementioned conditions are satisfied (for example, if one or more of the conditions (A) and (B) are satisfied, or if one or more of the conditions (A') and (B') are satisfied), exemplary operations for selecting an access network for establishing PDN connection matched with the active MAPCON rule are as follows. The following operations are only exemplary, and the present invention is not limited to the following operations.

Exemplary operation 1—If the cellular access network is not an overload/congestion status, and if the WLAN which is currently used (or accessed) by the UE is an overload/congestion status, the UE can select the cellular access network to establish the corresponding PDN connection. Therefore, the UE can actively provide a service of the PDN connection through the cellular access network while preventing the WLAN which is currently used (or accessed) from being more congested.

Exemplary operation 2—If the cellular access network is an overload/congestion status, and if there exist(s) available WLAN(s) other than the WLAN which is currently used (or accessed) by the UE, the UE can perform a reselection operation of the WLAN. Therefore, the UE can actively provide a service of the PDN connection through the WLAN access network while preventing the cellular access network from being more congested.

Embodiment 3

If a UE (that is, UE according to the 3GPP release-11) operated in a transparent single-connection mode or a UE operated in a single-connection mode is already using (or accessing) a WLAN (or TWAN), an IP flow matched with the active NSWO rule should be routed to the WLAN due to the active NSWO rule. In this case, the corresponding UE can perform one or more of the following embodiments. According to the method suggested in the present invention, WLAN selection/reselection is included in access network selection candidates as one candidate even though the WLAN is currently used (or accessed), unlike the related art.

Embodiment 3-1

The UE may perform one or more operations of (1) and (2) below.

(1) The UE can check or determine whether routing of the IP flow is available in the form of NSWO-routing to the WLAN which is currently used (or accessed) (or whether EPC-routing of the IP flow is valid or effective).

(2) The UE can check or determine whether the WLAN which is currently used (or accessed) is a TWAN and is being used in the form of EPC-routing (or whether EPC access is only provided).

Embodiment 3-2

In the case that one or more of the following conditions (A) and (B) are satisfied:

(A) if the IP flow cannot be routed to the WLAN, which is currently used (or accessed), in the form of NSWO (or if EPC-routing of the IP flow is not valid or effective); and (B) if the WLAN which is currently used (or accessed) is a TWAN and is being used in the form of EPC-routing (or if EPC access is only provided), the UE can perform one or more of the following operations (i), (ii) and (iii) in selecting an access network for routing the IP flow:

(i) the UE selects a cellular access network;

(ii) the UE does not select a WLAN (or selects an access network other than the WLAN); and (iii) the UE performs a reselection operation of the WLAN.

Meanwhile, if the IP flow is set or defined to be routed in the form of EPC-routing not NSWO by using the WLAN (this may mean that the IP flow is set or defined by setup within the UE, the NSWO rule, the IFOM rule, the MAPCON rule or the ISRP), the UE may select the WLAN as an access network for routing the IP flow. Alternatively, if the IP flow is set or defined to be routed in the form of EPC-routing not NSWO by using the WLAN, the UE may select the WLAN, which is current used, as an access network for routing the IP flow.

Embodiment 3-3

In the case that one or more of the following conditions (A') and (B') are satisfied:

(A') if the IP flow can be routed to the WLAN, which is currently used (or accessed), in the form of NSWO (or if NSWO routing of the IP flow is valid or effective); and (B') if the WLAN which is currently used (or accessed) is a TWAN and is not being used in the form of NSWO, the UE can perform one or more of the following operations (i'), (ii') and (iii') in selecting an access network for routing the IP flow:

(i') the UE selects a WLAN;

(ii') the UE selects the WLAN which is currently used (or accessed); and (iii') the UE routes the IP flow to the WLAN which is currently used (or accessed).

In the embodiment 3-2 or 3-3, as reference information for determining one or more of the operations (i) to (v) in the UE, or as reference information for determining one or more of the operations (i') to (iii') in the UE, one or more of the followings ① to ⑪ may be used.

① Information indicated by the active NSWO rule or the policy that includes the NSWO rule. For example, indication(s) or flag(s) indicating one or more of the above (i) to (iii), or indication(s) or flag(s) indicating one or more of the above (i') to (iii').

② Load/overload/congestion information of the cellular access network. This information may be information acquired explicitly or implicitly from a network (for example, eNodeB, MME, ANDSF, etc.). For example, this information may be ACB (Access Class Barring) information, EAB (Extended Access Barring) information, etc., which are received from the eNodeB.

③ Load/overload/congestion information of a core network. This information may be information acquired explicitly or implicitly from a network (for example, eNodeB, MME, ANDSF, etc.). For example, this information may be a mobility management (MM) backoff timer or a session management (SM) backoff timer, which is received from the MME.

④ Signal strength information of the cellular access network. For example, this information may be RSRP (Reference Symbol Received Power), RSRQ (Reference Symbol Received Quality), etc.

⑤ Load/overload/congestion information of a WLAN which is currently used (or accessed). For example, this information may be BSS load information and/or a transmission rate of a backhaul to which the WLAN is connected.

⑥ Signal strength information of a WLAN which is currently used (or accessed).

⑦ Information indicating whether there is any available WLAN other than the WLAN which is currently used (or accessed).

⑧ Load/overload/congestion information of WLAN(s) which is(are) not used (or accessed) currently but available. For example, this information may be BSS load information and/or a transmission rate of a backhaul to which the WLAN is connected.

⑨ Signal strength information of WLAN(s) which is (are) not used currently (or accessed) but available.

⑩ User preference information.

⑪ Property of a target IP flow. For example, this property may include a type of an application of the corresponding IP flow, a protocol type, QoS property (for example, ToS (Type of Service), DS (Differentiated Service), etc.), a type or property (for example, whether APN is for Internet or IMS service) of an APN to which the corresponding IP flow belongs, and information indicating whether seamless handover is required for a cellular access network when the corresponding IP flow is out of WLAN coverage.

According to the present invention, based on the aforementioned various kinds of reference information (for example, one or more of ① to ⑪), if the aforementioned conditions are satisfied (for example, if one or more of the conditions (A) and (B) are satisfied, or if one or more of the conditions (A') and (B') are satisfied), exemplary operations for selecting an access network for routing an IP flow matched with the active NSWO rule are as follows. The following operations are only exemplary, and the present invention is not limited to the following operations.

Exemplary operation 1—If the cellular access network and the core network are not overload/congestion statuses, and if the WLAN which is currently used (or accessed) by the UE is an overload/congestion status, the UE can select the cellular access network to route the corresponding IP flow. Therefore, the UE can actively provide a service of the IP flow through the cellular access network while preventing the WLAN which is currently used (or accessed) from being more congested.

Exemplary operation 2—If the cellular access network is an overload/congestion status, and if there exist(s) available WLAN(s) other than the WLAN which is currently used (or accessed) by the UE, the UE can perform a reselection operation of the WLAN. Therefore, the UE can actively provide a service of the IP flow through the WLAN access network while preventing the cellular access network from being more congested.

Embodiment 4

If a UE operated in a multi-connection mode is already using (or accessing) a WLAN (or TWAN), an IP flow matched with the active NSWO rule should be routed to the WLAN due to the active NSWO rule. In this case, the corresponding UE can perform one or more of the following embodiments. According to the method suggested in the present invention, WLAN selection/reselection is included in access network selection candidates as one candidate even though the WLAN is currently used (or accessed), unlike the related art.

Embodiment 4-1

The UE may perform one or more operations of (1) and (2) below.

(1) The UE can check or determine whether routing of the IP flow is available in the form of NSWO-routing to the WLAN which is currently used (or accessed) (or whether EPC-routing of the IP flow is valid or effective).

(2) The UE can check or determine whether the WLAN which is currently used (or accessed) is a TWAN and is being used in the form of EPC-routing (or whether EPC access is only provided).

Embodiment 4-2

In the case that one or more of the following conditions (A) and (B) are satisfied:

(A) if the IP flow cannot be routed to the WLAN, which is currently used (or accessed), in the form of NSWO (or if EPC-routing of the IP flow is not valid or effective); and (B) if the WLAN which is currently used (or accessed) is a TWAN and is being used in the form of EPC-routing (or if EPC access is only provided), the UE can perform one or more of the following operations (i), (ii), (iii) and (iv) in selecting an access network for routing the IP flow:

(i) the UE selects a cellular access network;

(ii) the UE does not select a WLAN (or selects an access network other than the WLAN);

(iii) the UE performs a reselection operation of the WLAN; and (iv) the UE performs a re-access (or re-connection) operation to the WLAN which is currently used (or accessed).

Meanwhile, if the IP flow is set or defined to be routed in the form of EPC-routing not NSWO by using the WLAN (this may mean that the IP flow is set or defined by setup within the UE, the NSWO rule, the IFOM rule, the MAPCON rule or the ISRP), the UE may select the WLAN as an access network for routing the IP flow. Alternatively, if the IP flow is set or defined to be routed in the form of EPC-routing not NSWO by using the WLAN, the UE may select the WLAN, which is current used, as an access network for routing the IP flow.

Embodiment 4-3

In the case that one or more of the following conditions (A') and (B') are satisfied:

(A') if the IP flow can be routed to the WLAN, which is currently used (or accessed), in the form of NSWO (or if NSWO routing of the IP flow is valid or effective); and (B') if the WLAN which is currently used (or accessed) is a TWAN and is being used in the form of NSWO, the UE can perform one or more of the following operations (i'), (ii') and (iii') in selecting an access network for routing the IP flow:

(i') the UE selects a WLAN;

(ii') the UE selects the WLAN which is currently used (or accessed); and (iii') the UE routes the IP flow to the WLAN which is currently used (or accessed).

In the embodiment 4-2 or 4-3, as reference information for determining one or more of the operations (i) to (v) in the UE, or as reference information for determining one or more of the operations (i') to (iii') in the UE, one or more of the followings ① to ⑪ may be used.

① Information indicated by the active NSWO rule or the policy that includes the NSWO rule. For example, indication(s) or flag(s) indicating one or more of the above (i) to (iv), or indication(s) or flag(s) indicating one or more of the above (i') to (iii').

② Load/overload/congestion information of the cellular access network. This information may be information acquired explicitly or implicitly from a network (for example, eNodeB, MME, ANDSF, etc.). For example, this information may be ACB (Access Class Barring) information, EAB (Extended Access Barring) information, etc., which are received from the eNodeB.

③ Load/overload/congestion information of a core network. This information may be information acquired explicitly or implicitly from a network (for example, eNodeB, MME, ANDSF, etc.). For example, this information may be a mobility management (MM) backoff timer or a session management (SM) backoff timer, which is received from the MME.

④ Signal strength information of the cellular access network. For example, this information may be RSRP (Reference Symbol Received Power), RSRQ (Reference Symbol Received Quality), etc.

⑤ Load/overload/congestion information of a WLAN which is currently used (or accessed). For example, this information may be BSS load information and/or a transmission rate of a backhaul to which the WLAN is connected.

⑥ Signal strength information of a WLAN which is currently used (or accessed).

⑦ Information indicating whether there is any available WLAN other than the WLAN which is currently used (or accessed).

⑧ Load/overload/congestion information of WLAN(s) which is(are) not used (or accessed) currently but available. For example, this information may be BSS load information and/or a transmission rate of a backhaul to which the WLAN is connected.

⑨ Signal strength information of WLAN(s) which is (are) not used currently (or accessed) but available.

⑩ User preference information.

⑪ Property of a target IP flow. For example, this property may include a type of an application of the corresponding IP flow, a protocol type, QoS property (for example, ToS (Type of Service), DS (Differentiated Service), etc.), a type or property (for example, whether APN is for Internet or IMS service) of an APN to which the corresponding IP flow belongs, and information indicating whether seamless handover is required for a cellular access network when the corresponding IP flow is out of WLAN coverage.

According to the present invention, based on the aforementioned various kinds of reference information (for example, one or more of ① to ⑪), if the aforementioned conditions are satisfied (for example, if one or more of the conditions (A) and (B) are satisfied, or if one or more of the conditions (A') and (B') are satisfied), exemplary operations for selecting an access network for routing an IP flow matched with the active NSWO rule are as follows. The following operations are only exemplary, and the present invention is not limited to the following operations.

Exemplary operation 1—If the cellular access network and the core network are not overload/congestion statuses, and if the WLAN which is currently used (or accessed) by the UE is an overload/congestion status, the UE can select the cellular access network to route the corresponding IP flow. Therefore, the UE can actively provide a service of the IP flow through the cellular access network while preventing the WLAN which is currently used (or accessed) from being more congested.

Exemplary operation 2—If the cellular access network is an overload/congestion status, and if there exist(s) available WLAN(s) other than the WLAN which is currently used (or accessed) by the UE, the UE can perform a reselection operation of the WLAN. Therefore, the UE can actively provide a service of the IP flow through the WLAN access network while preventing the cellular access network from being more congested.

Figure 11:
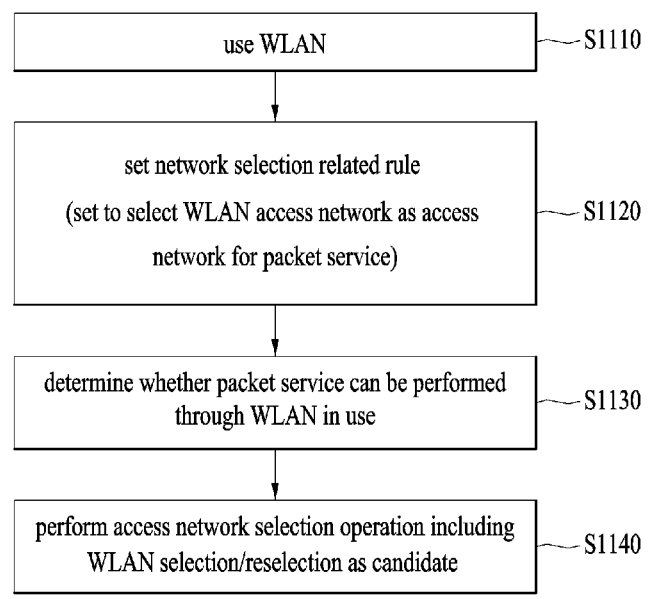
FIG. 11 is a flow chart illustrating a method for selecting a network according to an embodiment of the present invention.

FIG. 11 is a flow chart illustrating a method for selecting a network according to an embodiment of the present invention.

In step S1110, the UE is using (or accessing) a wireless LAN. This wireless LAN may be a TWAN.

In step S1120, the UE may be set based on policy information (this may be provided to the UE before, after or in parallel with the step S1110) for a rule related to network selection. For example, the UE may be set to select a wireless LAN access network as an access network (not cellular access network) for a packet service (or IP flow or IP traffic or application or PDN connection) in accordance with the above rule even though the wireless LAN is currently used.

In step S1130, the UE may determine whether an operation for performing the packet service (for example, routing for the IP flow, PDN connection establishment, etc.) can be performed through the wireless LAN which is currently used. For example, this determination operation may correspond to the operation for checking or determining (1) and (2) (or (3)) in the aforementioned various embodiments, or the operation for determining the condition of (A) and (B) (or (C)) (or the condition of (A') and (B') (or (C')).

In step S1140, the UE can perform an operation for selecting an access network. In this case, in the example of the present invention, even though the UE is currently using the wireless LAN, wireless LAN selection or wireless LAN reselection may be included in access network selection candidates as a candidate. Also, the candidates of the access network selection operation may correspond to the operation for performing the operation of (i), (ii), (iii) and (iv) (or (v)) in the aforementioned various embodiments. Based on reference information corresponding to one or more of ①to ⑪ in the aforementioned various embodiments, one or more of the candidates of the access network selection operation are performed.

Although the exemplary method described in FIG. 11 has been expressed as a series of operations for conciseness of description, a series of the operations are not intended to limit the order of steps, and the respective steps may be performed simultaneously or at different orders if necessary. Also, it is to be understood that all the steps illustrated in FIG. 11 are not required necessarily to implement the methods suggested in the present invention.

The method illustrated in FIG. 11 may be implemented in such a manner that the matters described in the aforementioned various embodiments of the present invention may be applied to the method independently or two or embodiments may be applied to the method simultaneously.

Figure 12:
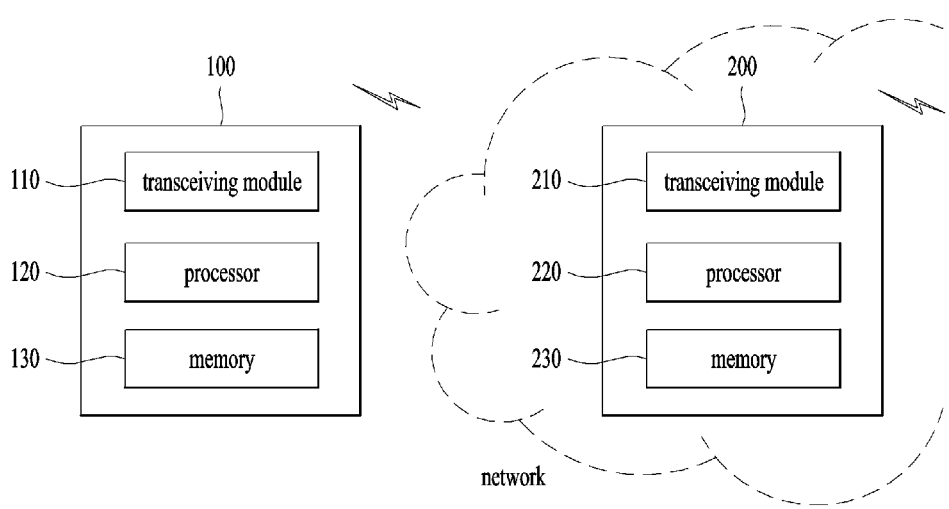
FIG. 12 is a diagram illustrating a UE and a network node device according to a preferred embodiment of the present invention.

FIG. 12 is a diagram illustrating a user equipment and a network node device according to a preferred embodiment of the present invention.

Referring to FIG. 12, the user equipment 100 according to the present invention may include a transceiving module 110, a processor 120, and a memory 130. The transceiving module 110 may be configured to transmit various signals, data and information to an external device and to receive various signals, data and information from the external device. The user equipment 100 may be connected with the external device through the wire and/or wireless. The processor 120 may control the overall operation of the user equipment 100, and may be configured to perform a function of operation-processing information to be transmitted to and received from the external device. Also, the processor 120 may be configured to perform a UE operation suggested in the present invention. The memory 130 may store the operation-processed information for a predetermined time, and may be replaced with a buffer (not shown).

Referring to FIG. 12, the network node device 200 according to the present invention may include a transceiving module 210, a processor 220, and a memory 230. The transceiving module 210 may be configured to transmit various signals, data and information to an external device and to receive various signals, data and information from the external device. The network node device 200 may be connected with the external device through the wire and/or wireless. The processor 220 may control the overall operation of the network node device 200, and may be configured to perform a function of operation-processing information to be transmitted to and received from the external device. The memory 230 may store the operation-processed information for a predetermined time, and may be replaced with a buffer (not shown).

Also, the details of the aforementioned user equipment 100 and the aforementioned network node device 200 may be configured in such a manner that the aforementioned various embodiments of the present invention may independently be applied to the aforementioned user equipment 100 and the aforementioned network node device 200, or two or more embodiments may simultaneously be applied to the aforementioned user equipment 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various mobile communication systems.

The invention claimed is:

1. A method for selecting an access network by a user equipment (UE) in a wireless communication system, the method comprising:
    determining whether a new packet service can be performed through a WLAN (Wireless Local Area Network) in use,
    wherein the new packet service is routed according to a NSWO (Non-Seamless WLAN Offload) rule when the UE is set to select the WLAN as an access network for the new packet service,
    wherein the UE is operated in a multi-connection mode which can be negotiated during authentication when connecting to a TWLAN (trusted WLAN), and
    wherein multi-connections between the UE and the WLAN comprise only PDN (Packet Data Network) connections, otherwise the UE is only authorized to connect in the form of EPC (Evolved Packet Core)—routing when connecting to the TWLAN; and
    performing an access network selection operation based on the determination,
    wherein the access network selection operation comprises selecting at least cellular access network, access network other than the WLAN in use, or the WLAN in use as candidates, and
    wherein the access network selection operation is performed based on reference information, the reference information including information indicating candidates of the access network selection operation indicated by the NSWO rule, load information of a cellular access network, load information of a core network, signal strength information of the cellular access network, load information of the WLAN in use, signal strength information of the WLAN in use, information indicating whether there is an available WLAN other than the WLAN in use, load information of an unused available WLAN, signal strength information of an unused available WLAN, user preference information, and property information of the new packet service.

2. The method according to claim 1, wherein the new packet service is IP (Internet Protocol) flow, IP traffic, application or PDN connection.

3. A user equipment (UE) for selecting an access network in a wireless communication system, the UE comprising:
    a transceiving module configured to transmit and receive information; and
    a processor configured to:
    determine whether a new packet service can be performed through a WLAN (Wireless Local Area Network) in use,
    wherein the new packet service is routed according to a NSWO (Non-Seamless WLAN Offload) rule when the UE is set to select the WLAN as an access network for the new packet service,
    wherein the UE is operated in a multi-connection mode which can be negotiated during authentication when connecting to a TWLAN (trusted WLAN), and
    wherein multi-connections between the UE and the WLAN comprise only PDN (Packet Data Network) connections, otherwise the UE is only authorized to connect in the form of EPC (Evolved Packet Core)—routing when connecting to the TWLAN; and
    perform an access network selection operation based on the determination,
    wherein the access network selection operation comprises selecting at least cellular access network, access network other than the WLAN in use, or the WLAN in use as candidates, and
    wherein the access network selection operation is performed based on reference information, the reference information including information indicating candidates of the access network selection operation indicated by the NSWO rule, load information of a cellular access network, load information of a core network, signal strength information of the cellular access network, load information of the WLAN in use, signal strength information of the WLAN in use, information indicating whether there is an available WLAN other than the WLAN in use, load information of an unused available WLAN, signal strength information of an unused available WLAN, user preference information, and property information of the new packet service.

4. The UE according to claim 3, wherein the new packet service is IP (Internet Protocol) flow, IP traffic, application or PDN connection.

* * * * *